(12) United States Patent
Zhang

(10) Patent No.: US 10,108,035 B2
(45) Date of Patent: Oct. 23, 2018

(54) CURVED BACKLIGHT UNIT, MANUFACTURING METHOD THEREOF AND DISPLAY DEVICE

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventor: Wenhao Zhang, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 26 days.

(21) Appl. No.: 15/507,614

(22) PCT Filed: Sep. 23, 2016

(86) PCT No.: PCT/CN2016/099914
§ 371 (c)(1),
(2) Date: Feb. 28, 2017

(87) PCT Pub. No.: WO2017/063494
PCT Pub. Date: Apr. 20, 2017

(65) Prior Publication Data
US 2017/0285391 A1 Oct. 5, 2017

(30) Foreign Application Priority Data

Oct. 12, 2015 (CN) .......................... 2015 1 0659402

(51) Int. Cl.
*G02F 1/1333* (2006.01)
*F21V 8/00* (2006.01)
*G02F 1/1335* (2006.01)

(52) U.S. Cl.
CPC ..... *G02F 1/133305* (2013.01); *G02B 6/0045* (2013.01); *G02B 6/0065* (2013.01); *G02B 6/0068* (2013.01); *G02F 1/133602* (2013.01)

(58) Field of Classification Search
CPC ......... G02F 1/133305; G02F 1/133602; G02F 1/1335; G02F 1/1333; G02F 1/133308;
(Continued)

(56) References Cited

U.S. PATENT DOCUMENTS

2009/0059563 A1   3/2009   Takata et al.
2015/0042920 A1   2/2015   Lee et al.
(Continued)

FOREIGN PATENT DOCUMENTS

CN   104345496 A   2/2014
CN   104407461 A   3/2015
(Continued)

OTHER PUBLICATIONS

"Unveiling the Secret of Backlight Architecture of Curved Liquid Crystals", EET; Jun. 24, 2016; 4 pages.
International Search Report and Written Opinion dated Nov. 30, 2016; PCT/CN2016/099914.
The First Chinese Office Action dated Mar. 24, 2017; Appln. No. 201510659402.7.

*Primary Examiner* — Bao Q Truong
(74) *Attorney, Agent, or Firm* — Ladas & Parry LLP; Loren K. Thompson

(57) ABSTRACT

A curved backlight unit, a display device and a manufacturing method are disclosed. The curved backlight unit includes a light guide plate (LGP), one or more cambered positioning pieces. The LGP is a curved LGP formed by extending from a center position of the LGP to both sides along a first direction and includes an inner cambered surface and an outer cambered surface. A second direction, perpendicular to the first direction, in the inner cambered surface or the outer cambered surface of the LGP is a linear direction. At least the center position of the LGP and at least (Continued)

one position on each side of the center portion are fixedly connected with a cambered structure of at least a same cambered positioning piece; and a bending direction of the cambered surfaces of the LGP is consistent with a bending direction of the cambered structure of the cambered positioning piece.

20 Claims, 3 Drawing Sheets

(58) Field of Classification Search
CPC ......... G02F 1/133608; G02F 1/133322; G02F 1/133328; G02F 1/133524; G02B 6/0045; G02B 6/0065; G02B 6/0068; F21V 8/00
See application file for complete search history.

(56) References Cited

U.S. PATENT DOCUMENTS

2015/0219324 A1* 8/2015 Kim .................. G02F 1/133305
349/58
2016/0095205 A1* 3/2016 Cho .................. G02F 1/133308
361/749

FOREIGN PATENT DOCUMENTS

| CN | 105259607 A | 1/2016 |
| CN | 204945578 U | 1/2016 |
| WO | 2006/070122 A1 | 7/2006 |

* cited by examiner

CURVED BACKLIGHT UNIT, MANUFACTURING METHOD THEREOF AND DISPLAY DEVICE

TECHNICAL FIELD

Embodiments of the present invention relate to a curved backlight unit, a manufacturing method thereof, and a display device comprising the curved backlight unit.

BACKGROUND

Curved display has the advantages of low screen reflectivity, high contrast, etc. Currently, curved display technology has been more and more widely applied in the fields of monitors, large-screen televisions, etc. Curved backlight unit in the curved display is very difficult in design and forming and is a key factor in the production of the curved display. The production of the curved backlight unit in the prior art adopts the method of forming elements of the curved backlight unit at first and subsequently assembling the elements, so not only the process is complex but also the cost is high.

SUMMARY

One aspect of the invention provides a curved backlight unit, comprising a light guide plate (LGP), one or more cambered positioning pieces, wherein the LGP is a curved LGP formed by extending from a center position of the LGP to both sides along a first direction and includes an inner cambered surface and an outer cambered surface; a second direction, perpendicular to the first direction, in the inner cambered surface or the outer cambered surface of the LGP is a linear direction; at least the center position of the LGP and at least one position on each side of the center portion are fixedly connected with a cambered structure of at least a same cambered positioning piece; and a bending direction of the cambered surfaces of the LGP is consistent with a bending direction of the cambered structure of the cambered positioning piece.

For example, the cambered positioning piece at least includes two end portions and a body portion connected with the two end portions; the body portion is the cambered structure extended along the first direction towards the two end portions; and the body portion is fixedly connected with at least one of the outer cambered surface and the inner cambered surface of the LGP.

For example, the curved backlight unit further comprises at least one first backplate and at least two second backplates, wherein a center position of the outer cambered surface of the LGP is fixedly connected with the first backplate; both sides of the outer cambered surface of the LGP are fixedly connected with the second backplates; and the cambered positioning piece is fixedly connected with the first backplate and the second backplates.

For example, the cambered positioning piece is an elongated structure.

For example, the cambered positioning piece at least includes a first positioning structure disposed in the middle and second positioning structures disposed at both ends; the first backplate at least includes a first retaining structure matched with the first positioning structure; and the second backplates at least include second retaining structures matched with the second positioning structures.

For example, the first positioning structure includes a positioning hole and a hook, and the first retaining structure is a bump; or the first positioning structure is a bump, and the first retaining structure includes a positioning hole and a hook.

For example, each of the second positioning structures is a recess, and each of the second retaining structures is a bump; or each of the second positioning structures is a bump, and each of the second retaining structures is a recess.

For example, a curvature of the cambered positioning piece is the same with that of the LGP.

For example, an optical film is further bonded to a side of the inner cambered surface of the LGP; a reflector plate is further bonded to a side of the outer cambered surface of the LGP; a hard film is bonded to an outer side of the reflector plate; self-restoring stators are disposed on the second backplates; both ends of the hard film are respectively wound on the self-restoring stators; and upon the LGP being deformed and the reflector plate is pressed, the hard film is released from the self-restoring stators, so that the hard film is capable of always compressing the reflector plate in the deformation process of the LGP, and hence the reflector plate is tightly bonded to the LGP.

For example, the LGP further includes two side faces and two cambered end faces which are extended along the first direction and opposite to each other; the two cambered end faces are respectively fixed on the first backplate through a first plastic frame element; and the two side faces are respectively fixed on the second backplates through a second plastic frame element.

For example, the first plastic frame element is made of an elastic material, and the second plastic frame element is made of a rigid material.

For example, the elastic material is hard rubber, and fine wires are added into the hard rubber.

Another aspect of the invention provides a method for manufacturing a curved backlight unit, comprising:

providing a light guide plate (LGP) and cambered positioning pieces, wherein the LOP is a flat LGP and includes a first plane and a second plane which are opposite to each other, two side faces which are intersected with the first plane and the second plane and opposite to each other, and two end faces which are intersected with the first plane and the second plane and opposite to each other;

allowing the LGP to be bent, along a direction from the first plane to the second plane, to form an LGP with a curved structure in which the first plane becomes an inner cambered surface and the second plane becomes an outer cambered surface, and meanwhile, allowing the two end faces to be also bent into two cambered end faces; and fixing the LGP with the curved structure through the cambered positioning pieces, and obtaining a curved LGP.

For example, the method further comprises providing at least one first backplate and at least two second backplates, wherein the first backplate is configured to fix the LGP at a center position of the second plane of the LGP, and the second backplates are configured to respectively fix the LGP at both ends of the second plane;

the cambered positioning piece at least includes two end portions and a body portion connected with the two end portions, and the body portion is a cambered structure extended towards the two end portions;

the two end portions of the cambered positioning piece are respectively connected with the second backplates; the body portion of the cambered positioning piece is disposed on a side of the second plane of the LGP; the first backplate drives the LGP to move towards a side of the body portion of the cambered positioning piece; and after the first backplate makes contact with the cambered positioning piece, the first backplate is fixedly connected with the cambered positioning piece.

For example, the method further comprises providing at least one first backplate and at least two second backplates, wherein the first backplate is configured to fix the LGP at a center position of the second plane of the LGP, and the second backplate is configured to respectively fix the LGP at both ends of the second plane;

the cambered positioning piece at least includes two end portions and a body portion connected with the two end portions, and the body portion is a cambered structure extended towards the two end portions;

the body portions of the cambered positioning pieces are fixedly connected with the first backplate along the two cambered end faces of the LGP; the two end portions of the cambered positioning piece are extended out of the LGP towards a third direction on a side of the first plane of the LGP; the second backplates drive the LGP to move towards the third direction; and after the second backplates make contact with the cambered positioning pieces, the second backplates are fixedly connected with the cambered positioning pieces.

For example, the cambered positioning piece is an elongated structure.

For example, the second backplate is provided with a bump; a recess matched with the bump is formed at both ends of the cambered positioning piece; the recess includes a first position and a second position; before the first backplate is driven to move towards the cambered positioning piece, the bump is disposed at a first position; and upon the first backplate being fixedly connected with the cambered positioning piece, the bump moves from the first position to a second position along the recess.

For example, a center portion of the cambered positioning piece is provided with a positioning hole and a hook; and the first backplate is provided with a bump matched with the positioning hole.

For example, before the LGP is bent, a reflector plate is mounted on a side of the LGP, and a hard film is bonded to an outer side of the reflector plate.

For example, the second backplates are provided with self-restoring stators; both ends of the hard film are respectively wound on the self-restoring stators; and upon the first backplate or the second backplates driving the LGP to move and the reflector plate is pressed, the hard film is released from the self-restoring stators, so that the hard film is capable of always compressing the reflector plate in the moving process of the LGP, and hence the reflector plate is tightly bonded to the LGP.

For example, before the movement of the LGP, LGP is subjected to pre-deformation in a moving direction of the LGP.

For example, mesh points of the LGP adopt concave design.

Another aspect of the invention provides a display device, comprising the curved backlight unit as mentioned above.

For example, cushion materials are disposed between an edge of the backlight unit and an edge of the array substrate.

For example, an area of a color filter on the CF substrate is greater than an area of a pixel corresponding to the color filter on the array substrate.

BRIEF DESCRIPTION OF THE DRAWINGS

Simple description will be given below to the accompanying drawings of the embodiments to provide a more clear understanding of the technical proposals of the embodiments of the present invention. Obviously, the drawings described below only involve some embodiments of the present invention but are not intended to limit the present invention.

FIG. 3b is a top view of FIG. 3a;

DETAILED DESCRIPTION

For more clear understanding of the objectives, technical proposals and advantages of the embodiments of the present invention, clear and complete description will be given below to the technical proposals of the embodiments of the present invention with reference to the accompanying drawings of the embodiments of the present invention. Obviously, the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

Figure 1A:
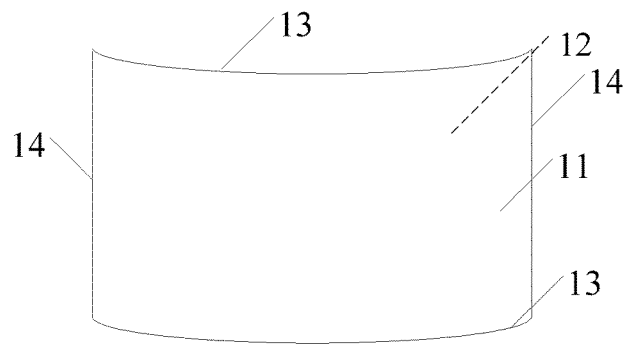
FIG. 1a is a schematic structural view of an LGP in a curved backlight unit provided by one embodiment of the present invention.

As illustrated in FIG. 1a, in the embodiment of the present invention, a curved light guide plate (LGP) includes an outer cambered surface 11 and an inner cambered surface 12 opposite to each other, two cambered end faces 13 opposite to each other, and two side faces 14 opposite to each other; both the inner cambered surface 12 and the outer cambered surface 11 are both cambered surface obtained by extending along a first direction from respective center positions to the two side faces 14, and the extension direction of the two cambered end faces 13 is basically consistent with that of the inner cambered surface and the outer cambered surface; the inner cambered surface and the outer cambered surface also have a second direction perpendicular to the first direction; the second direction is a straight line; and the first direction along the inner cambered surface and the outer cambered surface is a curved line. Within the inner cambered surface and the outer cambered surface, when the first direction is perpendicular to the second direction, the second direction being a straight line, the first direction being a curved line, the first direction and the second direction are uniquely determined directions. For clear description below, positions of the two cambered end faces 13 are defined to be upper and lower positions; positions of the two side faces 14 are defined to be left and right positions; and positions of the outer cambered surface 11 and the inner cambered surface 12 between the two side faces 14 are defined to be center positions. The two cambered end faces 13 of the LGP are formed by extending along the first direction basically consistent with the inner cambered surface 12 and the outer cambered surface 11. Actually, when the curved LGP is made into a curved display device such as a curved television, a viewer is located on the side of the inner cambered surface of the curved display device; the left and right position, the upper and lower positions and the center position of the inner cambered surface are consistent with the above definitions; and the inner cambered surface of the LGP is a light-emitting side. Definitions related to the upper and lower positions, the left and right positions and the center position in a manufacturing method of the curved backlight unit are the same with the definitions here.

The embodiment of the present invention provides a backlight unit, which may be applied to a display device with an edge-type light source structure and comprises an LGP and one or more cambered positioning pieces. The LGP is a curved LGP formed by extending along a first direction from a center position of the LGP to both sides and includes an inner cambered surface and an outer cambered surface; a second direction, perpendicular to the first direction, in the inner cambered surface and the outer cambered surface of the LGP is a linear direction; at least the center position of the LGP and at least one position on each side of the center position are fixedly connected with a cambered structure of at least the same cambered positioning piece; and the bending direction of the cambered surfaces of the LGP is consistent with the bending direction of the cambered structure of the cambered positioning piece.

When the number of fixed connection points between the cambered positioning structure of the cambered positioning piece and the center position and both sides of the curved LGP is larger, the positioning effect of the cambered positioning piece on the curved LGP is better. However, one fixed connection point must be formed on at least the center position of the curved LGP; one fixed connection point must be respectively formed on at least both sides of the center position; and the three fixed connection points are at least fixedly connected with the same cambered positioning piece. Moreover, the curved LGP can only be effectively positioned when the bending direction of the cambered positioning piece is consistent with the bending direction of the cambered surfaces of the LGP. It should be noted that the positioning principle of the cambered positioning piece on the curved LGP is that due to the fixed connection between the cambered structure with rigidity of the cambered positioning piece and the curved LGP, the tensile force on both sides and the pulling force at the center position of the curved LGP are canceled out, so that the change of the curvature of the curved LGP can be avoided, and hence the structural stability can be improved.

In one embodiment, the cambered positioning piece at least includes two end portions and a body portion connected with the two end portions; the body portion is a cambered structure extended along the first direction towards the two end portions; and the body portion is fixedly connected with at least one of the outer cambered surface or the inner cambered surface of the LGP. The body portion of the cambered positioning piece, for instance, may be a structure provided with an inner cambered surface and an outer cambered surface, and the curvature of the inner cambered surface and the outer cambered surface is, for instance, the same with the curvature of the curved LGP. The fixation between the cambered positioning piece, for instance, may be that the inner cambered surface of the cambered positioning piece and the outer cambered surface of the curved LGP are bonded and fixedly connected. The connection has low requirement on the width of the cambered positioning piece, and the cambered positioning piece may be a strip structure and may also be a cambered structure. Or the outer cambered surface of the cambered positioning piece and the inner cambered surface of the curved LGP may also be bonded and fixedly connected. However, at this point, as the inner cambered surface of the curved LGP is a light-emitting side of the curved LGP, for instance, a strip structure with small width may be adopted to avoid the influence on the luminous area of the curved LGP. Or end faces of the cambered positioning piece are fixedly connected with the upper and/or lower cambered end faces of the curved LGP. The connection, for instance, may adopt the thickness basically similar to that of the curved LOP, and the end faces of the cambered positioning piece, for instance, may be matched with the cambered end faces of the LOP.

In one embodiment, the curved backlight unit further comprises at least one first backplate and at least two second backplates, wherein the center position of the outer cambered surface of the LGP is fixedly connected with the first backplate; both sides of the outer cambered surface of the LGP are fixedly connected with the second backplates; and the cambered positioning piece is fixedly connected with the first backplate and the second backplates. For instance, the bending direction of the inner cambered surface of the cambered structure is consistent with the bending direction of the cambered surfaces of the LGP. For instance, the curvature of the cambered structure is the same with the curvature of the LGP. For instance, the cambered positioning piece at least includes two end portions and one body portion connected with the two end portions; the cambered positioning piece may be a cambered structure extended from the body portion of the cambered positioning piece to the two end portions; the two end portions of the cambered positioning piece are respectively fixedly connected with one of the second backplates disposed on both sides of the outer cambered surface of the LGP; and the body portion of the cambered positioning piece is fixedly connected with the first backplate.

Figure 1B:
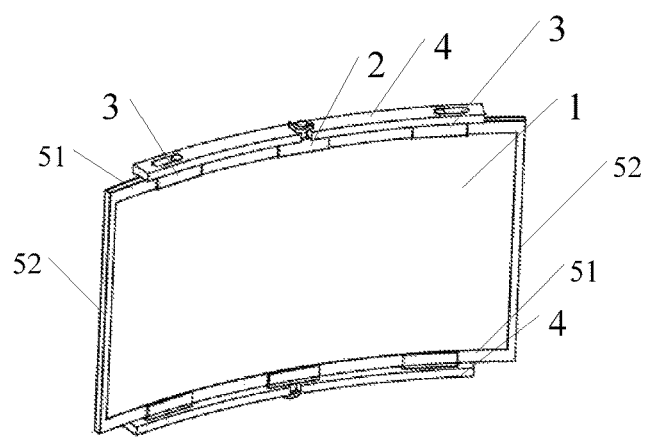
FIG. 1b is a stereogram of a curved backlight unit structure provided by one embodiment of the present invention.
Figure 1C:
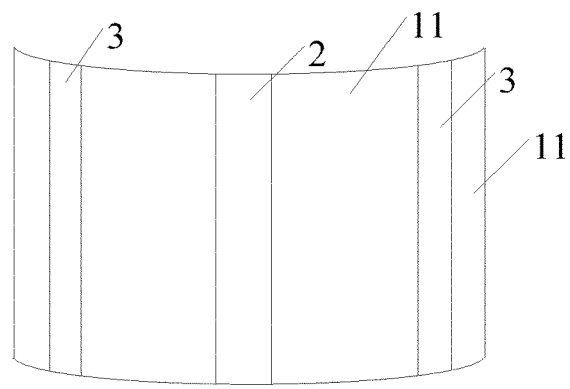
FIG. 1c is a schematic structural view illustrating the process of mounting backplates on an outer cambered surface of the LGP in the curved backlight unit provided by one embodiment of the present invention.

FIG. 1*b* is a stereogram of the curved backlight unit provided by one embodiment of the present invention, and FIG. 1*c* is a schematic structural view illustrating the process of mounting the backplates on the outer cambered surface of the LGP in the curved backlight unit provided by one embodiment of the present invention. As illustrated in FIGS. 1*b* and 1 *c*, the outer cambered surface 11 of the curved LGP 1 is respectively fixed through one first backplate 2 disposed at the center position of the outer cambered surface 11 of the LGP 1 and two second backplates 3 disposed on both sides of the outer cambered surface 11. As illustrated in FIG. 1*a*, the curved LGP 1 includes an inner cambered surface 12 and an outer cambered surface 11 opposite to each other, two cambered end faces 13 opposite to each other, and two side faces 14 opposite to each other; the center position is a position of the outer cambered surface 11 of the LGP 1 between the left and right side faces 14 of the LGP; and both sides, for instance, may be positions of the outer cambered surface 11 of the LGP 1 near the two side faces 14 of the LGP 1 (including the two side faces). As illustrated in FIG. 1*c*, the first backplate 2 and the second backplates 3, for instance, may be arranged along a direction basically parallel to the two side faces of the LGP 1. Moreover, the length of the first backplate 2 and the second backplates 3, for instance, may be basically the same with that of the two side faces of the LGP 1, so that the LGP 1 can be effectively fixed without increasing the size of the backlight unit. The first backplate 2 and the second backplates 3, for instance, may also form fixed connection simultaneously on the outer cambered surface 11 and the upper and lower cambered end faces 13 of the LGP 1, so that the structural stability can be further improved. The mode in which the backplates are fixed on both the outer cambered surface 11 and the upper and lower cambered end faces 13 of the LGP 1 does not depart from the scope of the present invention. In addition, the first backplate 2 and the second backplates 3 are fixedly connected with at least one cambered positioning piece 4. As shown in FIG. 1b, both the upper and lower cambered end faces 13 of the LGP are fixedly connected with one cambered positioning piece 4 through the first backplate 2 and the second backplates 3. By adoption of the structure that both the upper and lower cambered end faces 13 of the LGP are fixedly connected with the cambered positioning piece, the structure of the entire backlight unit can be more stable. The cambered positioning piece 4 can position the first backplate 2, the second backplates 3 and the LGP 1, so that the deformation of the LGP 1 can be avoided. The curvature and the bending direction of the cambered surfaces of the cambered positioning piece 4, for instance, may be basically the same with the curvature and the bending direction of the cambered surfaces of the curved LGP 1. In addition, the outer cambered surface 11 of the curved LGP 1 may also be fixed through a plurality of mutually separate backplates, for instance, 5 or 7 backplates. The structure of the curved LGP may also be more stable by increasing the number of the backplates.

In one embodiment, the cambered positioning piece may be an elongated structure. Continuing to refer to FIG. 1b, the cambered positioning piece as shown in FIG. 1b is an elongated structure. The cambered positioning piece 4 is a cambered structure extended from the center of the cambered positioning piece to both sides; a first positioning structure 41 is disposed on a center portion of the cambered positioning piece; a second positioning structure 42 is respectively disposed at both ends; correspondingly, a first retaining structure 21 matched with the first positioning structure 41 is disposed on the first backplate 2; and a second retaining structure 31 matched with the second positioning structure 42 is disposed on the second backplate 3. As illustrated in FIG. 1, for instance, two cambered positioning pieces 4 may be respectively disposed on the upper and lower cambered surfaces 13 of the LGP 1. Specifically, the cambered positioning pieces 4 are fixed on the upper and lower cambered end faces 13 of the LGP 1 through the first backplate 2 and the second backplates 3. As described above, for instance, the radian of the cambered positioning piece 4 may be basically the same with that of the LGP 1, and the bending direction of the cambered positioning piece, for instance, is also the same with the bending direction of the cambered surfaces of the curved LGP 1.

In one embodiment, the cambered positioning piece 4 may also be a structure extended, along the first direction basically parallel to the outer cambered surface of the LGP 1, on one side of the first backplate 2 and the second backplates 3 away from the outer cambered surface of the LGP 1. For instance, a plurality of cambered positioning pieces 4 parallel to each other may be arranged, and fixed connection points are formed at intersected positions of each cambered positioning piece 4 and the first backplate and the second backplates 3. By arrangement of the plurality of cambered positioning pieces 4, the structural strength of the curved backlight unit can be effectively improved.

Figure 2:
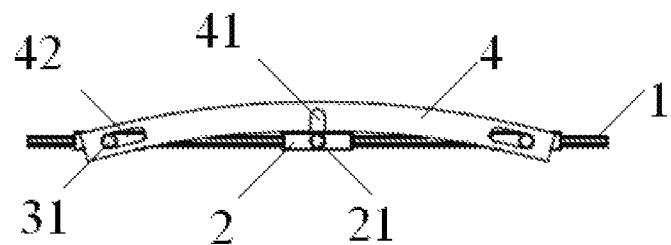
FIG. 2 is a schematic diagram illustrating the fastening modes of a cambered positioning piece and the backplates in the curved backlight unit provided by one embodiment of the present invention.

FIG. 2 is a schematic diagram illustrating the process of arranging positioning structures on the cambered positioning piece. As illustrated in FIG. 2, for instance, a first positioning structure 41, for instance, a positioning hole, is disposed at the center position of the cambered positioning piece 4; second positioning structures 42 are disposed at both ends of the cambered positioning piece; and for instance, the second positioning structure 42 is an elongated recess. The cambered positioning piece 4 is fixed with the first retaining structure 21 on the first backplate 2 through the first positioning structure 41 of the cambered positioning piece, and the first retaining structure 21, for instance, may be a bump; and both ends of the cambered positioning piece 4 are respectively fastened with the second retaining structures 31 disposed on the second backplates 3 at both ends through the second positioning structures 42 disposed at both ends of the cambered positioning piece, and the second retaining structure 31, for instance, may also be a bump. A hook may further be further disposed near the positioning hole of the cambered positioning piece 4. Thus, after the bump enters the positioning hole of the cambered positioning piece, the bump is further hooked and hence cannot be removed from the positioning hole. In addition, as known by those skilled in the art, the positioning structures disposed on the cambered positioning piece 4 and the retaining structures on the backplates may be exchanged.

In one embodiment, the first positioning structure 41 of the cambered positioning piece 4 may also be a threaded hole, and the first retaining structure 21 on the first backplate 2 is a stud matched with the threaded hole. The fastening means is to screw the stud into the threaded hole. The first positioning structure 41 may also be stud, and the first retaining structure 21 is designed to be a threaded hole.

As illustrated in FIG. 2, the second positioning structure 42 of the cambered positioning piece may be a recess, and the second retaining structure 31 of the second backplate 3 is a bump capable of being matched with the recess. The bump, for instance, may be clamped into the recess to limit the possible relative motion between the cambered positioning piece 4 and the second backplate 3. The second retaining structure 31 on the second backplate 3 may also be designed to be a recess, and the second positioning structure 41 of the cambered positioning piece 4 is designed to be a bump, so that the fastening of the cambered positioning piece 4 and the second backplate 3 can be achieved. For instance, the second positioning structure 42 may also be a threaded hole, and correspondingly, the second retaining structure 31 on the second backplate 3 is a stud. The fastening means is to screw the studs on the second backplates 3 into the threaded holes formed at both ends of the cambered positioning piece. As described above, the positions of the threaded holes and the studs on the backplate and the cambered positioning piece may also be exchanged.

In one embodiment, the cambered positioning pieces 4 may also be numerous, and both ends of each cambered positioning piece are connected with the second backplates 3 through, for instance, thread and stud or hole and bump. Thus, a plurality of cambered positioning pieces 4 basically parallel to the curved LOP 1 along the first direction are formed after the first backplate 2 and the second backplates 3 are formed. Correspondingly, a plurality of retaining structures are disposed on the first backplate 2 from the top down and are respectively fastened with the cambered positioning pieces at corresponding positions. The fastening means may adopt the structures described in the prior art or the above description in the present invention, so that the structural stability of the curved LGP 1 can be further guaranteed.

In one embodiment, the cambered positioning piece may also be a cambered structure basically covering the LGP and the backplates. The cambered positioning piece provided with the cambered structure may be extended, along the direction basically parallel to the outer cambered surface of the LGP 1, on a side of the first backplate 2 and the second backplates 3 away from the outer cambered surface of the LGP 1. The size of the cambered positioning piece provided with the cambered structure, for instance, may be basically the same with that of the LGP 1. A plurality of fixed points may be formed at intersected positions of the inner cambered surface of the cambered positioning piece provided with the cambered structure and the first backplate 2 and the second backplates 3, so that the structural stability can be further improved.

In one embodiment, for instance, the LGP 1 may be fixed on the backplates respectively through plastic frames. As illustrated in FIG. 1b, for instance, second plastic frame elements 52 may be adopted to fix the LGP 1 and the second backplates 3 at the left and right sides respectively, and first plastic frame elements 51 are adopted to fix the LGP 1 and the first backplate 2 at the upper and lower sides. For instance, the first plastic frame elements 51 may be elastic materials, e.g., being hard rubber. The hard rubber refers to rubber materials which are synchronously bent with the LGP only in the pulling direction and cannot be sunk or have other deformations when the LGP is deformed by, for instance, pulling the first backplate or the second backplate. The second plastic frame elements 52 may be rigid materials, e.g., hard plastics. For instance, fine wires may also be doped in the hard rubber, so that the one-dimensional linear bending strength of the hard rubber can be improved.

Figure 4:
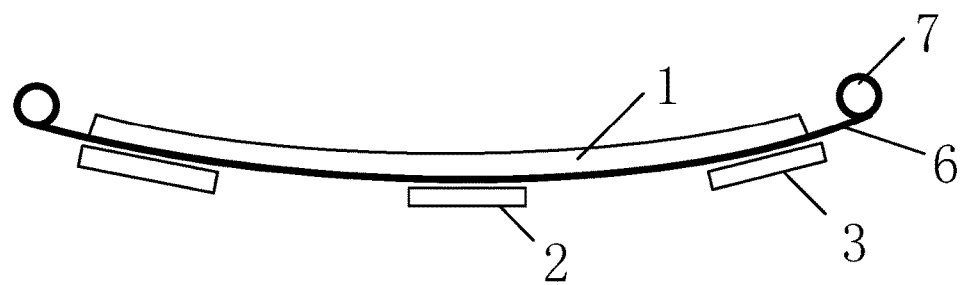
FIG. 4 is a schematic structural sectional view of a backlight unit provided by one embodiment of the present invention.

In one embodiment, various optical films such as a diffuser film and a prism film are also bonded to a side of the inner cambered surface of the curved LGP 1. A reflector plate is further, for instance, bonded to a side of the outer cambered surface of the curved LGP 1. A hard film may further be, for instance, tightly bonded to the outside of the reflector plate. Moreover, self-restoring stators are disposed on the second backplates, and both ends of the hard film are respectively wound on the self-restoring stators. When the LGP is deformed and the reflector plate is pressed, the hard film is released from the self-restoring stators, so that the hard film can always compress the reflector plate in the deformation process of the LGP, and hence the reflector plate can be tightly bonded to the LGP. When the hard film is bonded to the outside of the outer cambered surface and/or the reflector plate of the LGP 1, the flatness of the outer cambered surface and/or the reflector plate of the LGP 1 can be improved. The hard film refers to a film which does not change in thickness and may be synchronously deformed with the reflector plate under the action of an acting force applied to the reflector plate. For instance, the hard film is a flexible film or a rigid film. The optical films, for instance, may be positioned in recesses of the first plastic frame elements and/or the second plastic frame elements via lugs, or are sealed into the recesses of the first plastic frame elements and/or the second plastic frame elements via adhesive tapes, or are fixed by arranging film lug supports, grooves or the like on the first backplate 2 and/or the second backplates 3. For instance, as illustrated in FIG. 4, the self-restoring stators 7 are disposed on both sides of the LGP 1 along the first direction, and both ends of the hard film 6 are wound on the self-restoring stators 7.

The embodiment of the present invention further provides a method for manufacturing a curved backlight unit, which comprises the following steps:

providing an LGP and cambered positioning pieces, wherein the LGP is a flat LGP and includes a first plane and a second plane which are opposite to each other, two side faces which are intersected with the first plane and the second plane and opposite to each other, and two end faces which are intersected with the first plane and the second plane and opposite to each other;

allowing the LGP to be bent, along the direction from the first plane to the second plane, to form an LGP with a curved structure in which the first plane is an inner cambered surface and the second plane is an outer cambered surface, and meanwhile, allowing the two end faces to be also bent into two cambered end faces; and fixing the LGP with the curved structure through the cambered positioning pieces, and obtaining a curved LGP.

In one embodiment, the method further comprises the step of providing at least one first backplate and at least two backplates, wherein the first backplate is configured to fix the LGP from a center position of the second plane of the LGP, and the two second backplates are configured to respectively fix the LOP from both ends of the second plane;

the cambered positioning piece at least includes two end portions and a body portion connected with the two end portions, and the body portion is a cambered structure extended towards the two end portions;

the two end portions of the cambered positioning piece are respectively connected with the second backplates; the body portion of the cambered positioning piece is disposed on the side of the second plane of the LGP; the first backplate drives the LGP to move towards the side of the body portion of the cambered positioning piece; and after the first backplate makes contact with the cambered positioning piece, the first backplate is fixedly connected with the cambered positioning piece.

In one embodiment, the method further comprises the step of providing at least one first backplate and at least two second backplates, wherein the first backplate is configured to fix the LOP from a center position of the second plane of the LGP, and the two second backplates are configured to fix the LGP from both ends of the second plane respectively;

the cambered positioning piece at least includes two end portions and a body portion connected with the two end portions, and the body portion is a cambered structure extended towards the two end portions;

the body portions of the cambered positioning pieces are fixedly connected with the first backplate along the two cambered end faces of the LGP; the two end portions of the cambered positioning piece are extended out of the LOP towards a third direction on one side of the first plane of the LOP; the second backplates drive the LOP to move towards the third direction; and after the second backplates make contact with the cambered positioning pieces, the second backplates are fixedly connected with the cambered positioning pieces.

Figure 3A:
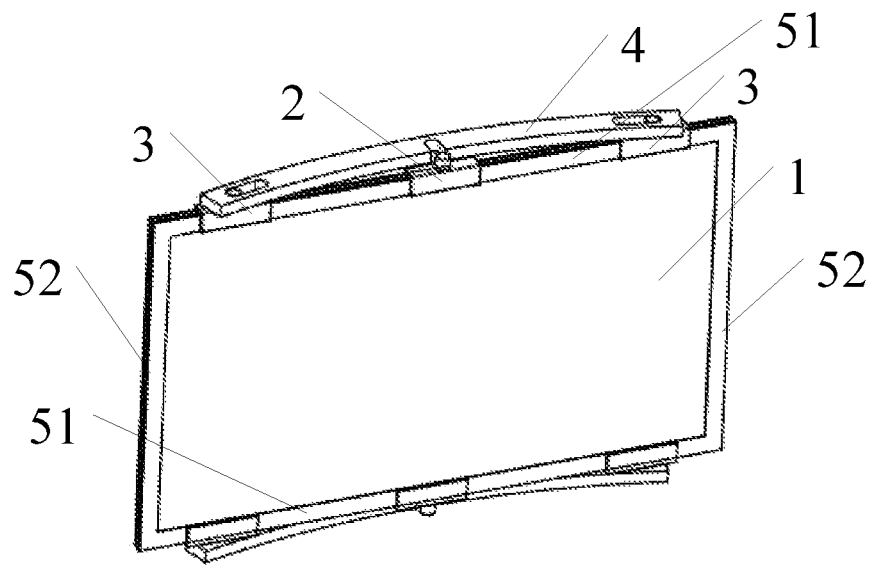
FIG. 3a is a schematic status diagram illustrating the process of pulling previous elements in a method for manufacturing a curved backlight unit by pulling a first backplate, in one embodiment of the present invention.
Figure 3B:
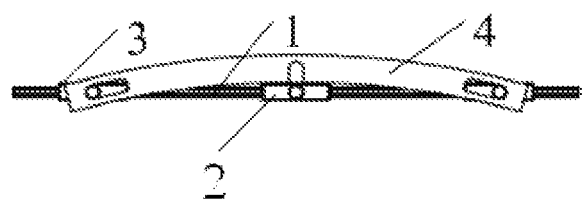
Figure 3C:
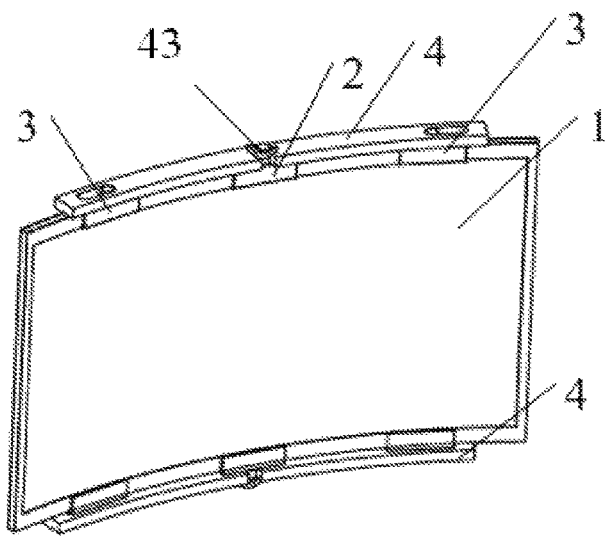
FIG. 3c is a final schematic structural view of a product obtained in the method for manufacturing the curved backlight unit by pulling the first backplate, in one embodiment of the present invention.

FIGS. 3a to 3c illustrate one embodiment of the method for manufacturing the curved backlight unit provided by the present invention. As illustrated in FIG. 3a, the second plane of the flat LGP is fixed through one first backplate 2 and two backplates 3 respectively, in which the first backplate 2 fixes the LOP at the center position of the second plane, and the two second backplates 3 fix the LOP at both ends of the plane. Two cambered positioning pieces 4 with elongated structures are adopted to be fastened with the second backplates 3 at the upper and lower end faces of the second backplate 3 respectively. FIG. 3b is a top view in the state. The first backplate 2 is pulled so that the LGP call be driven to move towards the cambered positioning pieces 4; even the curved LGP is bent along the direction from the first plane to the second plane; and when the first backplate makes contact with the cambered positioning pieces, for instance, may be disposed between the upper and lower cambered positioning pieces 4, the first retaining structure disposed on the first backplate 2 is positioned through the first positioning structures of the cambered positioning pieces 4. FIG. 3c is a schematic diagram of a curved backlight unit structure obtained after the fastening of the first backplate and the cambered positioning pieces, in one embodiment. As illustrated in FIG. 3c, the first positioning structure, for instance, is a positioning hole, and the first retaining structure is a bump. After the bump enters the positioning hole, the bump is hooked by a hook 43 and hence cannot be removed from the positioning hole. In the means of obtaining the curved LGP by pulling the first backplate to drive the flat LGP to move, an acting force is only applied to the first backplate, so that the flat LGP can be slowly converted into the curved LGP. In the curved LGP obtained by this means, the deformation of the flat LGP is gradually reduced from the center position of the flat LGP to both ends.

In the method of obtaining the curved backlight unit by means of, for instance, pulling the first backplate to drive the LGP to move towards inner cambered surfaces of the cambered positioning pieces, as described above, the fastening of the first backplate 2 and the cambered positioning pieces 4 may be the matching of threads and studs and may also be the matching of bumps and through holes and hooks. As illustrated in FIGS. 3b and 3c, second positioning structures 42 at both ends of the cambered positioning piece 4, for instance, may be elongated recesses; the recess, for instance, may include a first position and a second position; and second retaining structures 31 on the second backplates 3 fastened with the recesses, for instance, may be bumps. Before the first backplate 2 is pulled, the bumps on the second backplates 3 are fastened at the first positions as shown in FIG. 3b; when the first backplate drives the LGP to move towards the cambered positioning pieces 4, as the LGP is gradually bent, the bumps on the two second backplates 3 will also move along with the elongated recesses; and when the first backplate 2 moves to make contact with the cambered positioning pieces, for instance, moving to the position between the upper and lower cambered positioning pieces, the bumps on the second backplates 3 move to the second positions of the recesses as shown in FIG. 3c, and the fastening of the bumps and the recesses is achieved at the second positions. As illustrated in FIGS. 3b and 3c, the first positions of the elongated recesses at both ends of the cambered positioning piece 4 are disposed on the outer side relative to the second positions, and the two second positions are disposed on the inner side. The reason is that: when the LGP is in the planar state, the bumps on the two second backplates are far in distance and hence are respectively fastened at the first positions on the outer side of the elongated recesses, as shown in FIG. 3b; and when the LGP is gradually bent towards the cambered positioning pieces, the distance between the two bumps is gradually reduced, so the two bumps are subjected to relative motion along respective elongated recesses, and are finally fastened at the second positions on the inner side of the elongated recesses after the LGP moves in place, as show in FIG. 3c.

In one embodiment, the cambered positioning piece is an elongated structure; two cambered positioning pieces 4 are adopted to be fastened with the first backplate 2 from the upper and lower ends of the first backplate 2 respectively; both ends of the cambered positioning piece 4 are extended out of the LGP from the upper and lower sides of the LGP to the light-emitting direction of the LGP; subsequently, the second backplates 3 are pulled to drive the LGP to move towards the cambered positioning pieces 4, so that both sides of the second plane of the LGP are bent along the direction from the second plane to the first plane; and when the second backplates move to make contact with the cambered positioning pieces, for instance, may be disposed between the upper and lower cambered positioning pieces 4, the second backplates are positioned through the cambered positioning pieces 4. In the means of pulling the second backplates to drive the LGP to move, the two second backplates must be simultaneously applied by, for instance, basically same acting force, so that both sides of the flat LGP are close to both ends of the cambered positioning pieces simultaneously, and hence the flat LGP is gradually converted into a curved structure from both sides of the flat LGP to the center. After the flat LGP is converted into the curved LGP, the deformation of the LGP is gradually reduced from both sides to the center.

In the method of obtaining the curved backlight unit by means of, for instance, pulling the second backplates to drive the LGP to move towards the cambered positioning pieces, as described above, the fastening structure of the first backplate 2 and the cambered positioning pieces 4 may be the matching of threads and studs, may be the matching of bumps and through holes and hooks, and may also be other mutually fixed or fastened structures; the second positioning structures at both ends of the cambered positioning piece 4, for instance, may be through-hole structures, and correspondingly, the retaining structures on the second backplates may be bumps; after the second backplates are pulled to make contact with the cambered positioning pieces, the bumps are matched with the through holes to achieve fastening; or one hook may also be further disposed at both ends of the cambered positioning piece 4 respectively, so that the bumps can be further fixed by the hooks after entering the through holes and hence cannot be removed, and hence the structural stability can be further improved. The second positioning structures at both ends of the cambered positioning piece 4 may also be threads or studs, and correspondingly, the retaining structures on the two backplates may be studs or threads. By the matching of the threads and the studs, the fixation of the cambered positioning pieces 4 and the second backplates 2 can be achieved.

In one embodiment, in the method of manufacturing the curved backlight unit by means of, for instance, pulling the first backplate, the first backplate, for instance, may move to positions at which the first backplate is at least partially overlapped with the cambered positioning pieces, so that the fastening of the first backplate and the cambered positioning pieces can be more firm. The overlapping here refers to that the first backplate is at least partially overlapped with the cambered positioning pieces, when viewed along the linear direction in the inner cambered surface or the outer cambered surface of the curved LGP, after the LGP is pulled and converted into the curved structure.

In one embodiment, in the method of manufacturing the curved backlight unit by means of, for instance, pulling the second backplates, the second backplates, for instance, may move to positions at which the second backplates are at least partially overlapped with the cambered positioning pieces, so that the fastening of the second backplates and the cambered positioning pieces can be more firm. The overlapping here refers to that the second backplates are at least partially overlapped with the cambered positioning pieces, when viewed along the linear direction in the inner cambered surface or the outer cambered surface of the LOP, after the second backplates are pulled and the LGP is converted into the curved structure.

In one embodiment, in order to not affect the flatness of the gradually bent second plane of the LGP and the reflector plate bonded to the second plane of the LOP when the backplates drive the LGP to move, a hard film may be bonded to the outer side of the LOP and the reflector plate. The hard film refers to a film which does not change in thickness and may be synchronously deformed with the reflector plate under the action of an acting force applied to the reflector plate. For instance, the hard film is a flexible film. Moreover, for instance, the hard film may be rollable materials, and self-restoring stators (equivalent to rotary axes) opposite to each other are disposed at outer edges of the second backplates on both sides. Both ends of the rollable hard film are wound on the self-restoring stators, and meanwhile, a center portion of the hard film is fixed at the center position of the first backplate. Thus, when the first backplate moves backward, is close to the cambered positioning pieces, and is finally clamped into the cambered positioning pieces, a surface of the rigid hard film may be deformed from a plane to a cambered surface under the slow pressing of the LGP and the reflector plate, and the length will also be increased. The variation of the length of the hard film will produce certain tensile force. The tensile force will drive the self-restoring stators to rotate, so that partial hard film wound on the self-restoring stators can be released. The pressing structure in which the hard film is wound on the self-restoring stators may automatically adjust the release amount according to the radian of the curved backlight unit, and can avoid the damage of the hard film due to overlarge force. For instance, the self-restoring stators may be disposed on the second backplates on both sides (equivalent to that one rotary axis is respectively disposed on one side of the two second backplates away from the first backplate), and may also be disposed on the outside of the second backplates through transition pulleys. The main function of the self-restoring stators is that the self-restoring stators are taken as carriers on which the hard film is wound, and automatically release partially wound hard film as required when the first backplate or the second backplates are pulled, so that the hard film can compress the LGP and the reflector plate, and hence the outer cambered surface and the reflector plate of the LGP can be more smooth in the moving process, and the damage of the hard film due to overlarge force on the hard film can also be avoided. The hard film and the self-restoring stators may be disposed in the final product and may also be removed from the final product.

In one embodiment, in order to obtain better bending deformation effect of the LGP, the LGP may be subjected to specific pre-deformation. For instance, when the curved backlight unit is manufactured by means of pulling the first backplate or pulling the second backplates, the LGP may be subjected to specific pre-deformation towards the moving direction of the LGP at first before pulling, so that possible defects of the LGP in the pulling process can be reduced, and hence the curvature of the cambered surfaces of the final curved LGP can have a smoother transition.

In one embodiment, mesh points of the LGP may be designed to be concave structures. The reason is that: in the process of converting a flat backlight unit into the curved backlight unit, the LGP and other components will have relative displacement, and the relative displacement will result in the friction between the LGP and other components, so that the mesh points designed on the LGP can be damaged. The damage of the mesh points on the LGP will result in unexpected reflection of light, so that many problems such as light leakage and uneven brightness can be caused. Therefore, the mesh points on the LGP may be designed to be concave structures.

In one embodiment, as illustrated in NG. 3a, the left and right sides of the LGP 1 may be respectively fixed on the second backplates 3 through the second plastic frame elements 52, and the upper and lower sides of the LGP 1 may be fixed on the first backplate 2 through the first plastic frame elements 51. As the basically planar state of the LGP 1 must be converted into curved state, in the process, the first plastic frame elements 51 disposed on the upper and lower sides of the LGP 1 will be subjected to bending deformation. Thus, the first plastic frame elements 51 shall adopt deformable elastic materials, for instance, may adopt hard rubber. In order to further improve the bending strength of the first plastic frame elements 51, metal wires such as steel may be added into the rubber, so that the first plastic frame elements can be better matched with the first backplate 2, the second backplates 3, the LGP 1, the cambered positioning pieces 4 and the like to achieve the conversion from the flat backlight unit to the curved backlight unit: The second plastic frame elements 52, for instance, may adopt hard plastics.

One embodiment of the present invention further provides a curved display device comprising the curved backlight unit provided by the present invention.

A method for manufacturing the curved display device may comprise the manufacturing method of the foregoing curved backlight unit. Specifically, for instance, two manufacturing processes may be provided. One is to adopt the above method to manufacture the curved backlight unit, and meanwhile, adopt the prior art to form a front-end display matched with the curved backlight unit, combine the curved backlight unit manufactured by the method provided by the present invention and the front-end display part manufactured by the prior art, and obtain the curved display device.

The other method is that: a backlight unit which is basically a planar structure is matched and combined with a front-end display part which is basically a planar shape. For instance, the front-end display may be matched and fastened with hooks on sectional type backplates of the backlight unit through sectional type iron frames, so that the front-end display part can be fixed with the backlight unit. After the flat display is manufactured, the front end of the display is bent backward along with the backlight unit by the means of pulling the first backplate, and is positioned into, for instance, recesses of cambered positioning pieces after the first backplate is pulled in place, and hence the curved display can be formed.

In order to further improve the display effect of the display device manufactured by the method, for instance, siliceous rubber strips may be bonded to parts of inner surfaces of the iron frames making contacting with the display, so that the crushing injury of the display in the pulling process can be avoided. In addition, soft rubber materials are disposed at positions of plastic frame elements on the left and right sides of the display making contact with the display, so that the abrasion of the display by the plastic frame elements in the pulling process can be avoided.

In one embodiment, an outer frame of the display may be simultaneously pulled when, for instance, the first backplate is pulled, so that the outer frame can be deformed together with the display. The reason is that: as the strength of the frame is generally high, the deformation is very difficult, so the display may be damaged due to overlarge pulling force in the means of independently pulling the backplates.

In one embodiment, for instance, the design of a color filter (CF) substrate in the display may be adjusted, and the RGB area of color filters on the CF substrate is designed to be slightly greater than the area of TFT pixels at corresponding positions, so that the phenomenon of light leakage in the bending deformation process of the display can be avoided. In addition, polystyrene for supporting the cell gap of a liquid crystal cell in the display shall have high strength, so that the phenomenon of light leakage when the display is applied with a force can be avoided.

The above preferred embodiments may be mutually combined, do not depart from the scope of the present invention, and can obtain better combination effects.

The foregoing is only the preferred embodiments of the present invention and not intended to limit the scope of protection of the present invention. The scope of protection of the present invention should be defined by the appended claims.

The application claims priority to the Chinese patent application No. 201510659402.7, filed on Oct. 12, 2015, the disclosure of which is incorporated herein by reference as part of the application.

The invention claimed is:

1. A curved backlight unit, comprising a light guide plate (LGP), one or more cambered positioning pieces, wherein the LGP is a curved LGP formed by extending from a center position of the LGP to both sides along a first direction and includes an inner cambered surface and an outer cambered surface; a second direction, perpendicular to the first direction, in the inner cambered surface or the outer cambered surface of the LGP is a linear direction; at least the center position of the LGP and at least one position on each side of the center portion are fixedly connected with a cambered structure of at least a same cambered positioning piece; and a bending direction of the cambered surfaces of the LGP is consistent with a bending direction of the cambered structure of the cambered positioning piece.

2. The curved backlight unit according to claim 1, wherein the cambered positioning piece at least includes two end portions and a body portion connected with the two end portions; the body portion is the cambered structure extended along the first direction towards the two end portions; and the body portion is fixedly connected with at least one of the outer cambered surface and the inner cambered surface of the LGP.

3. The curved backlight unit according to claim 1, further comprising at least one first backplate and at least two second backplates, wherein a center position of the outer cambered surface of the LGP is fixedly connected with the first backplate; both sides of the outer cambered surface of the LGP are fixedly connected with the second backplates; and the cambered positioning piece is fixedly connected with the first backplate and the second backplates.

4. The curved backlight unit according to claim 3, wherein the cambered positioning piece is an elongated structure.

5. The curved backlight unit according to claim 4, wherein the cambered positioning piece at least includes a first positioning structure disposed in the middle and second positioning structures disposed at both ends; the first backplate at least includes a first retaining structure matched with the first positioning structure; and the second backplates at least include second retaining structures matched with the second positioning structures.

6. The curved backlight unit according to claim 1, wherein a curvature of the cambered positioning piece is the same with that of the LGP.

7. The curved backlight unit according to claim 3, wherein an optical film is further bonded to a side of the inner cambered surface of the LGP; a reflector plate is further bonded to a side of the outer cambered surface of the LGP; a hard film is bonded to an outer side of the reflector plate; self-restoring stators are disposed on the second backplates; both ends of the hard film are respectively wound on the self-restoring stators; and upon the LGP being deformed and the reflector plate is pressed, the hard film is released from the self-restoring stators, so that the hard film is capable of always compressing the reflector plate in the deformation process of the LGP, and hence the reflector plate is tightly bonded to the LGP.

8. The curved backlight unit according to claim 3, wherein the LGP further includes two side faces and two cambered end faces which are extended along the first direction and opposite to each other; the two cambered end faces are respectively fixed on the first backplate through a first plastic frame element; and the two side faces are respectively fixed on the second backplates through a second plastic frame element.

9. The curved backlight unit according to claim 8, wherein the first plastic frame element is made of an elastic material, and the second plastic frame element is made of a rigid material.

10. The curved backlight unit according to claim 1, further comprising second plastic frame elements and at least one first backplate, wherein the center position of the outer cambered surface of the LGP is fixedly connected with the first backplate; both sides of the outer cambered surface of the LGP are respectively fixedly connected with one of the second plastic frame elements, respectively; and the cambered positioning piece is fixedly connected with the first backplate and the second plastic frame elements in the first direction.

11. A method for manufacturing a curved backlight unit, comprising:
providing a light guide plate (LGP) and cambered positioning pieces, wherein the LGP is a flat LGP and includes a first plane and a second plane which are opposite to each other, two side faces which are intersected with the first plane and the second plane and opposite to each other, and two end faces which are intersected with the first plane and the second plane and opposite to each other;
allowing the LGP to be bent, along a direction from the first plane to the second plane, to form an LGP with a curved structure in which the first plane becomes an inner cambered surface and the second plane becomes an outer cambered surface, and meanwhile, allowing the two end faces to be also bent into two cambered end faces; and
fixing the LGP with the curved structure through the cambered positioning pieces, and obtaining a curved LGP.

12. The method for manufacturing the curved backlight unit according to claim 11, further comprising providing at least one first backplate and at least two second backplates, wherein the first backplate is configured to fix the LGP at a center position of the second plane of the LGP, and the second backplates are configured to respectively fix the LGP at both ends of the second plane;
the cambered positioning piece at least includes two end portions and a body portion connected with the two end portions, and the body portion is a cambered structure extended towards the two end portions;

the two end portions of the cambered positioning piece are respectively connected with the second backplates; the body portion of the cambered positioning piece is disposed on a side of the second plane of the LGP; the first backplate drives the LGP to move towards a side of the body portion of the cambered positioning piece; and after the first backplate makes contact with the cambered positioning piece, the first backplate is fixedly connected with the cambered positioning piece.

13. The method for manufacturing the curved backlight unit according to claim 11, further comprising providing at least one first backplate and at least two second backplates, wherein the first backplate is configured to fix the LGP at a center position of the second plane of the LGP, and the second backplate is configured to respectively fix the LGP at both ends of the second plane;

the cambered positioning piece at least includes two end portions and a body portion connected with the two end portions, and the body portion is a cambered structure extended towards the two end portions;

the body portions of the cambered positioning pieces are fixedly connected with the first backplate along the two cambered end faces of the LGP; the two end portions of the cambered positioning piece are extended out of the LGP towards a third direction on a side of the first plane of the LGP; the second backplates drive the LGP to move towards the third direction; and after the second backplates make contact with the cambered positioning pieces, the second backplates are fixedly connected with the cambered positioning pieces.

14. The method for manufacturing the curved backlight unit according to claim 12, wherein the second backplate is provided with a bump; a recess matched with the bump is formed at both ends of the cambered positioning piece; the recess includes a first position and a second position; before the first backplate is driven to move towards the cambered positioning piece, the bump is disposed at a first position; and upon the first backplate being fixedly connected with the cambered positioning piece, the bump moves from the first position to a second position along the recess.

15. The method for manufacturing the curved backlight unit according to claim 12, wherein before the LGP is bent, a reflector plate is mounted on a side of the LGP, and a hard film is bonded to an outer side of the reflector plate.

16. The method for manufacturing the curved backlight unit according to claim 15, wherein the second backplates are provided with self-restoring stators; both ends of the hard film are respectively wound on the self-restoring stators; and upon the first backplate or the second backplates driving the LGP to move and the reflector plate is pressed, the hard film is released from the self-restoring stators, so that the hard film is capable of always compressing the reflector plate in the moving process of the LGP, and hence the reflector plate is tightly bonded to the LGP.

17. The method for manufacturing the curved backlight unit according to claim 11, wherein before the movement of the LGP, LGP is subjected to pre-deformation in a moving direction of the LGP.

18. The method for manufacturing the curved backlight unit according to claim 11, wherein mesh points of the LGP adopt concave design.

19. A display device, comprising the curved backlight unit according to claim 1.

20. The display device according to claim 19, further comprising an array substrate and a color filter (CF) substrate, wherein an area of a color filter on the CF substrate is greater than an area of a pixel corresponding to the color filter on the array substrate.

* * * * *